United States Patent

Burke

Patent Number: 5,094,396
Date of Patent: Mar. 10, 1992

[54] RETRACTABLE REEL ASSEMBLY FOR TELEPHONE EXTENSION CORD

[76] Inventor: Paul C. Burke, 470 Heather La., Lake Forest, Ill. 60045

[21] Appl. No.: 541,846

[22] Filed: Jun. 21, 1990

Related U.S. Application Data

[63] Continuation-in-part of Ser. No. 267,184, Nov. 4, 1988, Pat. No. 4,989,805.

[51] Int. Cl.$^5$ ............................................. B65H 75/48
[52] U.S. Cl. ................................. 242/107.1; 242/107.7
[58] Field of Search ........... 242/107.1, 107.11, 107.12, 242/107.13, 107.14, 107.15, 107.7; 191/12.2 R, 12.4; 379/441, 442, 454

[56] References Cited

U.S. PATENT DOCUMENTS

| | | | |
|---|---|---|---|
| 1,276,825 | 8/1918 | Swope | 242/107.1 |
| 1,446,410 | 2/1923 | Bennett et al. | 242/107.1 |
| 1,737,978 | 12/1929 | Sebell . | |
| 1,865,069 | 6/1932 | Allen . | |
| 1,958,626 | 5/1934 | Krantz | 242/107.7 |
| 2,206,352 | 7/1940 | Hellman . | |
| 2,211,561 | 8/1940 | Flannelly . | |
| 2,262,587 | 11/1941 | Kaempf . | |
| 2,678,779 | 5/1954 | Bellmer . | |
| 2,979,576 | 4/1961 | Huber | 242/107.7 |
| 3,061,234 | 10/1962 | Morey | 242/107.1 |
| 3,584,157 | 6/1971 | Prescott . | |
| 3,657,491 | 4/1972 | Ryder et al. | 242/107.7 X |
| 4,053,118 | 10/1977 | Aikins | 242/107.11 |
| 4,062,608 | 12/1977 | Pierce . | |
| 4,384,688 | 5/1983 | Smith | 242/107.7 |
| 4,472,010 | 9/1984 | Parnello . | |
| 4,646,987 | 3/1987 | Peterson | 242/107.11 |

FOREIGN PATENT DOCUMENTS 171356 11/1951 Fed. Rep. of Germany ... 242/107.1

*Primary Examiner*—John M. Jillions
*Attorney, Agent, or Firm*—Wood, Phillips, Mason, Recktenwald & VanSanten

[57] ABSTRACT

To provide a highly functional yet very compact retractable reel assembly for a telephone extension cord, a housing is provided which is adapted to be mounted on a wall in proximity to a telephone or telephone jack for utilization with either wall mounted or table telephones, respectively. The retractable reel assembly includes a reel biased for rotation in one direction, a ratchet for selectively restraining rotation of the reel in the one direction, and an expansion chamber for a length of the cord within the housing, whereby the portion of the cord leading to the telephone or telephone jack can normally be wound in a radially and axially confined planar helical array. With this arrangement, the retractable reel assembly can allow the portion of the cord to be repositioned to a radially expanded helical array during withdrawal of the remainder of the cord from the housing and returned to the radially and axially confined helical array during retraction of the remainder of the cord into the housing.

32 Claims, 6 Drawing Sheets

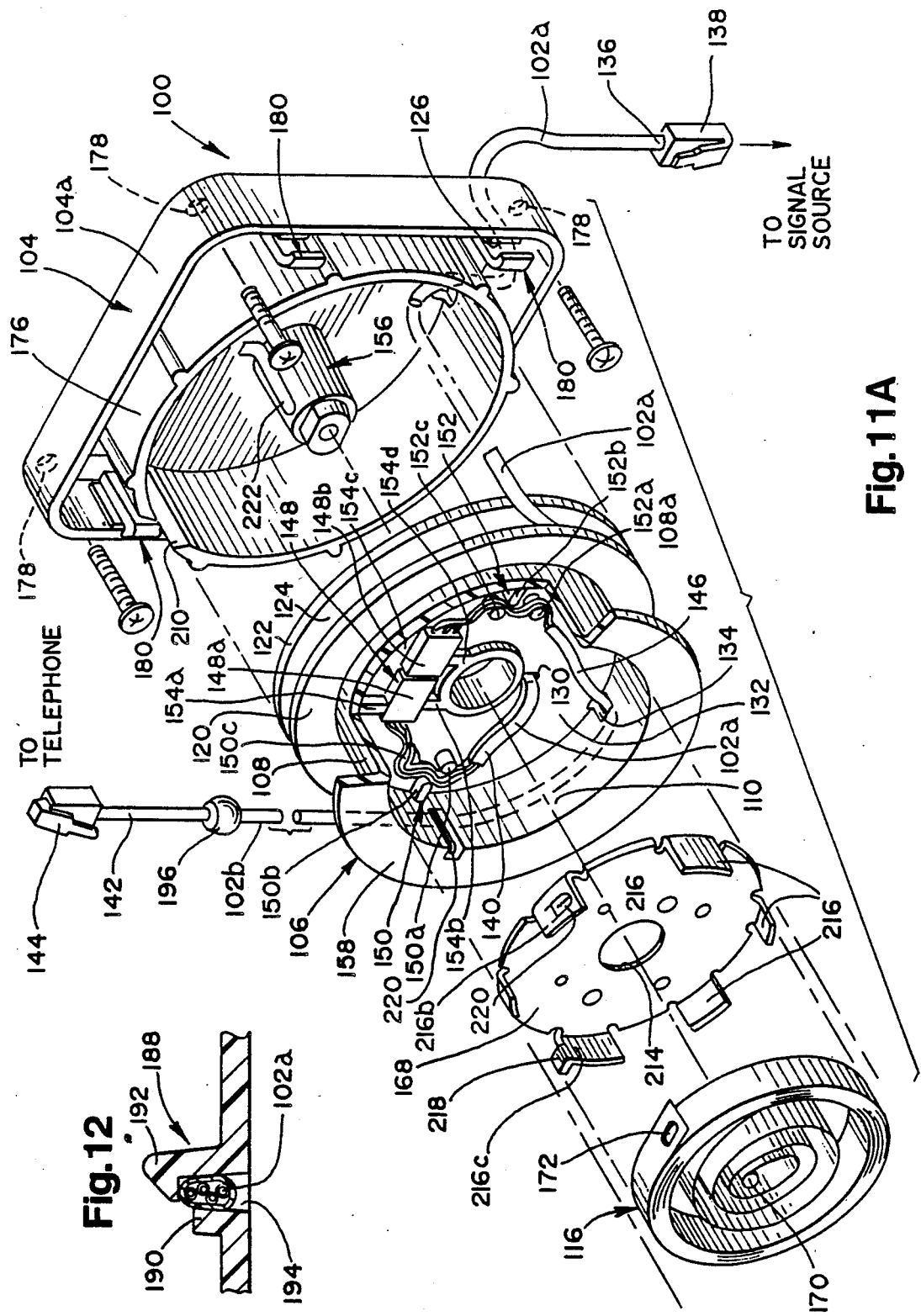

RETRACTABLE REEL ASSEMBLY FOR TELEPHONE EXTENSION CORD

CROSS-REFERENCE

This is a continuation-in-part of commonly owned and co-pending related application Ser. No. 267,184, filed on Nov. 4, 1988, entitled "Retractable Reel Assembly For Telephone Extension Cord."

FIELD OF THE INVENTION

The present invention relates generally to elongated cord storage devices and, more particularly, to a retractable reel assembly for a telephone or other communications extension cord.

BACKGROUND OF THE INVENTION

Over the years, there have been many attempts to provide retractable reels for a diverse multitude of applications. For instance, it has been recognized that retractable reels have application for long extendible electrical cords, signal cables, water hoses, air hoses, and the like, which preferably remain attached or connected at their source but, nevertheless, present a problem relative to storage during periods in which they are not in use. In one particular application, the desirability of a retractable reel assembly for telephone extension cords has been recognized.

For instance, U.S. Pat. No. 1,276,825, issued on Aug. 27, 1918, to D. Swope discloses a reel disposed within a box wherein a loaded spring is utilized. A cord extends from a signal box, enters the box, and is wrapped around a spindle, and the cord is then wrapped around a reel, exits the box, and is secured to a telephone. Unfortunately, Swope requires a spindle device in which the cord is wrapped in an extended axial direction, greatly increasing the size of the box.

Furthermore, Swope does not disclose any means for restraining retraction of the cord and, thus, the cord is in constant tension and, upon releasing the telephone, the cord will automatically be retracted into the box.

U.S. Pat. No. 4,384,688, issued on May 24, 1983 to J. N. Smith discloses a retractable reel which permits the extension and retraction of a cord through a pair of openings. Smith uses a loaded spring for retracting the cord. Further, Smith provides a ratchet gear having a pawl with an accompanying spring to retain the cord in a selected position of extension.

Nevertheless, Smith must provide a recess in a sidewall to permit a clamp to fit within the structure, and the cord must be coiled over a portion of its length where it exits the housing. Further, Smith teaches the necessity of the coiled cord exiting the housing axially and, as a result, is entirely unsuited for mounting on a wall in proximity to a telephone jack.

Still other attempts to deal with the problem of providing a retractable reel assembly for a telephone extension cord are disclosed in the prior art in a wide variety of embodiments. Among these are Pierce U.S. Pat. No. 4,062,608; Prescott U.S. Pat. No. 3,584,157; Bellmer U.S. Pat. No. 2,678,779; Kaempf U.S. Pat. No. 2,262,587; Flannelly U.S. Pat. No. 2,211,561; Hellmann U.S. Pat. No. 2,206,352; Allen U.S. Pat. No. 1,865,069; and Sebell U.S. Pat. No. 1,737,978. However, no one has succeeded in providing a compact housing to be mounted on a wall in proximity to a telephone jack for withdrawal and retraction of a telephone extension cord.

Accordingly, it is an object of the present invention to provide a compact retractable reel assembly for a telephone extension cord.

It is a further object of the present invention to provide such a retractable reel assembly where the housing can be mounted at a selected location along a wall in proximity to a telephone or telephone jack so as to be relatively inconspicuous.

It is also an object of the present invention to provide such a retractable reel assembly where the housing can be mounted on a wall at varying distances from a telephone or telephone jack by reason of an excess of telephone extension cord.

It is a still further object of the present invention to provide such a retractable reel assembly where the telephone extension cord can be withdrawn from the housing to a selected point, retained at that selected point, and later withdrawn back into the housing.

Additionally, it is an object of the present invention to provide such a retractable reel assembly where the telephone extension cord feeds the signal directly through the assembly without the utilization of movable contacts.

The present invention is directed to overcoming the above stated problems and accomplishing the stated objects by providing an improved and compact retractable reel assembly for a telephone exfension cord.

SUMMARY OF THE INVENTION

Accordingly, the present invention is directed to a retractable reel assembly for a telephone or other communications extension cord (hereinafter collectively referred to as telephone extension cord) having a housing adapted to be mounted on a wall in proximity to a telephone or telephone jack. The retractable reel assembly includes a reel defined by a cylindrical wall and journaled for rotation about an axis in the housing, a spring for biasing the reel for rotation in one direction, and a ratchet in the housing for selectively restraining rotation of the reel in the one direction. As will be appreciated, the spring is mounted to extend between the housing and the reel to cause the biasing of the reel for rotation in the one direction for retraction of the telephone extension cord.

In the exemplary embodiment, the reel has a cord-retaining radial wall on at least one side thereof, which is disposed in closely spaced adjacent relation to a wall of the housing to define a radial cord expansion chamber in the housing. The housing has a first opening disposed about the perimeter thereof leading to the expansion chamber and a second opening disposed about the perimeter thereof leading from the reel and the first and second openings are axially spaced from one another. Additionally, the reel has an axially extending aperture in the radial wall leading from the expansion chamber in closely spaced adjacent relation to the axis of the reel and also has a radially extending aperture in the cylindrical wall.

With this construction, the cord includes a first portion normally wound in a radially confined helical array about the axis of the reel in the expansion chamber. The first portion of the cord is maintained in an axially confined planar helical array by the radial wall of the reel and the housing wall and is of a length to permit withdrawal of at least a portion thereof to reach the telephone or telephone jack. Furthermore, the first portion of the cord has an end extending from the first opening in the housing for connection to the telephone or telephone jack.

With this construction, the cord also includes a second portion normally substantially entirely wound on the cylindrical wall of the reel. The second portion of the cord is of a length to permit withdrawal of at least a portion thereof by pulling on the second portion of the cord to rotate the reel in a direction opposite the one direction of spring biasing to accommodate movement of a telephone from one location to another. Additionally, the second portion of the cord has an end extending from the second opening in the housing for connection to the telephone or telephone handset.

As will be appreciated, the cord extends through the axially extending aperture in the radial wall of the reel and the radially extending aperture in the cylindrical wall of the reel to join the first and second portions thereof. It will, in fact, be appreciated that the entire cord is entirely integral. In the preferred embodiment, the cord is flat and includes a plug-in connector on one end thereof for connection to the telephone jack or telephone and a plug-in connector on the other end thereof for connection to the telephone or telephone handset, respectively.

In the preferred embodiment, the first portion of the cord is capable of being repositioned to a radially expanded helical array during withdrawal of the second portion of the cord. This is accommodated by reason of the initially radially confined helical array into which the first portion of the cord is normally wound, and by reason of the cooperation of the expansion chamber in maintaining the cord in the axially confined planar helical array. Similarly, the first portion of the cord is capable of being returned to the radially confined helical array during retraction of the second portion of the cord.

Preferably, the housing includes a spindle and the reel is carried by the spindle for rotation thereon. The spindle is advantageously integral with the housing. In addition, the spring is mounted so as to extend between the reel and the spindle of the housing.

Further, the reel preferably has a cord-retaining radial wall on both sides thereof maintained in spaced apart relation by the spindle. The spring is then disposed between the radial walls and radially inwardly of the cylindrical wall of the reel. With this arrangement, the spindle is adapted to extend through coaxial spindle-receiving bores in the respective radial walls.

In addition, one of the radial walls advantageously has a disc portion axially recessed within the cylindrical wall of the reel. The ratchet can then be mounted within the axially recessed disc portion of the one of the radial walls. By reason of this arrangement of the components, the retractable reel assembly is rendered highly functional while at the same time being desirably compact.

In another preferred embodiment, the reel has a pair of cord-retaining radial walls on one side thereof. The radial walls are disposed in closely spaced adjacent relation in this embodiment. In this manner, the radial walls define a radial cord expansion chamber in the housing.

In this embodiment, one of the radial walls of the reel has an axially extending aperture leading from the expansion chamber to a cord interconnection chamber. The cord interconnection chamber is radially inwardly of the cylindrical wall. Further, the cylindrical wall of the reel has a radially extending aperture leading from the cord interconnection chamber to a cord winding surface thereof.

With this arrangement, the cord includes a flat cord portion normally wound in a radially confined helical array about the axis of the reel in the expansion chamber. The flat cord portion is maintained in an axially confined planar helical array by the radial walls of the reel. It also has an end extending from a first opening in a housing by a distance sufficient to reach a telephone or telephone jack. The flat cord portion has a connector on the extending end for connection to the telephone or telephone jack. Additionally, the flat cord portion has a second end extending through the axially extending aperture in the one of the radial walls into the cord interconnection chamber.

Still further, the cord also includes a round cord portion normally substantially entirely wound on the cord winding surface of the cylindrical wall. The round cord portion is of a length to permit withdrawal of at least a portion through a second opening in the housing by pulling on an end of the round cord portion extending through the second opening in the housing to rotate the reel in a direction opposite that which a spring biases the reel to accommodate movement of the telephone or telephone handset from one location to another. Advantageously, the round cord portion has a connector on the extending end for connection to the telephone or telephone handset.

Preferably, the round cord portion also has a second end extending through the radially extending aperture in the cylindrical wall into the cord interconnection chamber such that means can be provided for connecting the flat cord portion to the round cord portion within the cord interconnection chamber. Most advantageously, strain relief means is also provided for each of the flat and round cord portions together with means for retaining the cord connecting means in a preselected fixed position within the cord interconnection chamber.

In a highly preferred embodiment, the reel has an additional cord-retaining radial wall integrally associated with the cylindrical wall. The additional cord-retaining radial wall along with the cylindrical wall and the nearest one of the previously mentioned pair of cord-retaining radial walls define a cord extension chamber. Still further, the additional cord-retaining radial wall advantageously has an associated removable disk portion axially recessed within the cylindrical wall.

With this arrangement, a ratchet including a ratchet gear and spring biased pawl lever is cooperatively nested within the axially recessed disk portion. The retractable reel assembly may also advantageously include a spring retainer axially recessed within the cylindrical wall of the reel wherein a spring may have one end secured to a spindle and the other end secured to the spring retainer. When so configured, the disk portion substantially entirely isolates the spring retainer and spring in an enclosed chamber within the reel.

In another respect, the retractable reel assembly preferably is formed such that the axially recessed disk portion has a central opening defined by an axially outwardly extending circumferential flange through which the spindle extends. The ratchet, as previously mentioned, includes a ratchet gear which advantageously has a circumferential recess adapted to receive the circumferential flange therewithin so as to guide rotational movement of the reel through the circumferential flange. By providing means for securing the ratchet gear to the spindle, the circumferential recess serves as a bearing for the circumferential flange during rotation of the reel.

With regard to the axially outwardly extending flange of the disk portion, it is preferably substantially continuous or uninterrupted about its periphery. The circumferential recess in the ratchet gear may then advantageously be defined by a pair of radially spaced apart and axially inwardly extending flanges. In this connection, a radially inwardly one of the flanges may be substantially continuous while the radially outwardly one of the flanges is periodically circumferentially interrupted.

With regard to the spring retainer, it is preferably axially recessed within the cylindrical wall of the reel as previously suggested. The spring retainer may then advantageously be generally disk-shaped and have a central opening through which the spindle extends together with means for securing the spring retainer to the reel for rotation therewith. With this arrangement, the spring preferably comprises a coil spring having one end secured to the spindle and the other end secured to the spring retainer.

Other objects, advantages, and features of the present invention will become apparent from the following specification taken in conjunction with the accompanying drawings.

BRIEF DESCRIPTION OF THE DRAWINGS

FIG. 11A is an exploded perspective view illustrating the other preferred embodiment in accordance with the present invention;

FIG. 12 is a cross-sectional view illustrating a strain relief arrangement for a flat cord portion of the other preferred embodiment in accordance with the present invention.

DETAILED DESCRIPTION OF THE PREFERRED EMBODIMENTS

Figure 1:
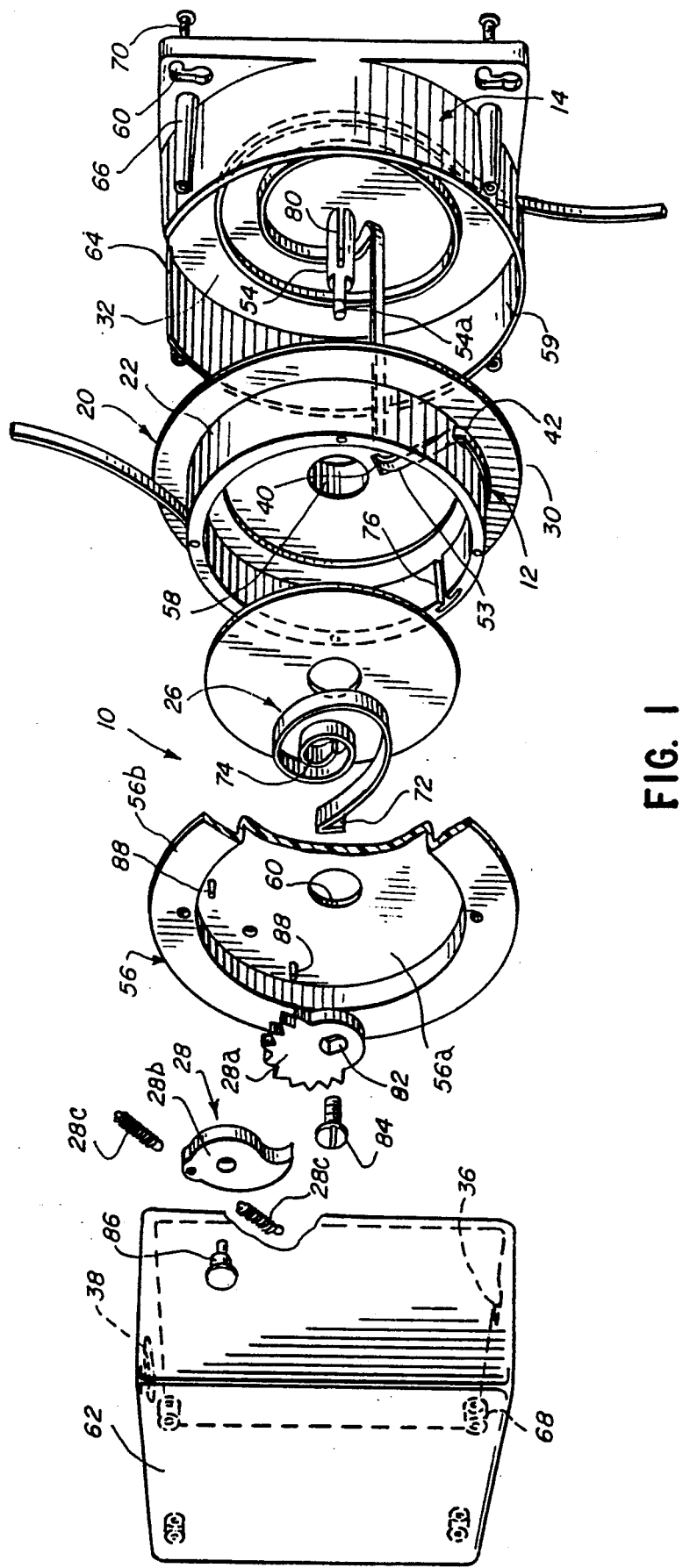
FIG. 1 is an exploded perspective view illustrating a retractable reel assembly for a telephone extension cord in accordance with the present invention.
Figure 2:
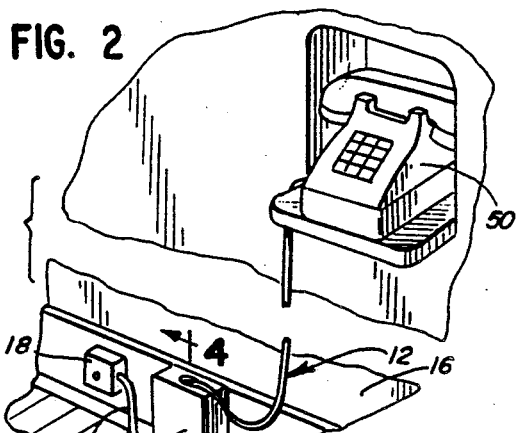
FIG. 2 is a perspective view illustrating the retractable reel assembly in a first wall-mounted position.
Figure 3:
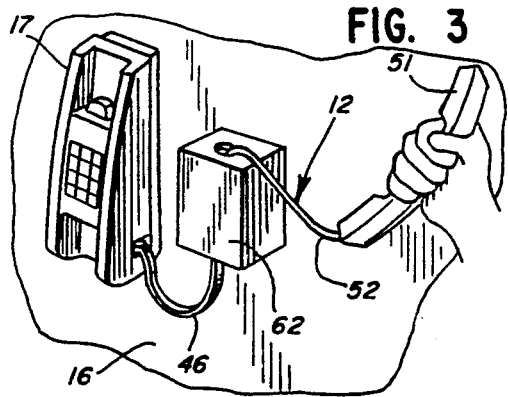
FIG. 3 is a perspective view illustrating the retractable reel assembly in a second wall-mounted position.

Referring to the drawings, and first to FIGS. 1 through 3, the reference numeral 10 designates generally first preferred embodiment of a retractable reel assembly for a telephone extension cord 12 including a housing 14 adapted to be mounted on a wall 16 in proximity to a telephone 17 or a telephone jack 18 for use with either wall mounted or table telephones, respectively. The retractable reel assembly 10 includes a reel 20 defined by a cylindrical wall 22 journaled for rotation about an axis 24 in the housing 14, a spring 26 mounted to extend between the housing 14 and the reel 20 for biasing the reel for rotation in one direction, and a ratchet 28 in the housing 14 for selectively restraining rotation of the reel 20 in the one direction. With this arrangement, the reel 20 has a cord-retaining radial wall 30 on at least one side thereof disposed in closely spaced adjacent relation to a wall 32 of the housing 14 to define a radial cord expansion chamber 34 (see FIGS. 4 and 5).

As will be appreciated by referring to FIGS. 1 through 3, the housing 14 has a first opening 36 disposed about the perimeter thereof leading to the expansion chamber 34 and a second opening 38 disposed about the perimeter thereof leading from the reel 20. The first opening 36 is axially spaced from the second opening 38 by reason of the axial spacing of the expansion chamber 34 from the reel 20. In addition and as illustrated in the drawings, the housing is formed such that the first opening 36 is disposed at the bottom thereof, while the second opening 38 is oval shaped and disposed at the top thereof to enhance the utility of the invention, as best illustrated in FIGS. 2 and 3.

Referring to FIG. 1, the radial wall 30 of the reel 20 has an axially extending aperture 40 leading from the expansion chamber 34 in closely spaced adjacent relation to the axis 24 of the reel 20. It will be seen that the cord 12 extends through this aperture 40 from the expansion chamber 34 into the space defined by the cylindrical wall 22 of the reel 20. Also as shown, the cylindrical wall 22 of the reel 20 has a radially extending aperture 42 spaced from the axially extending aperture 40 in the radial wall 30 of the reel 20.

Figure 4:
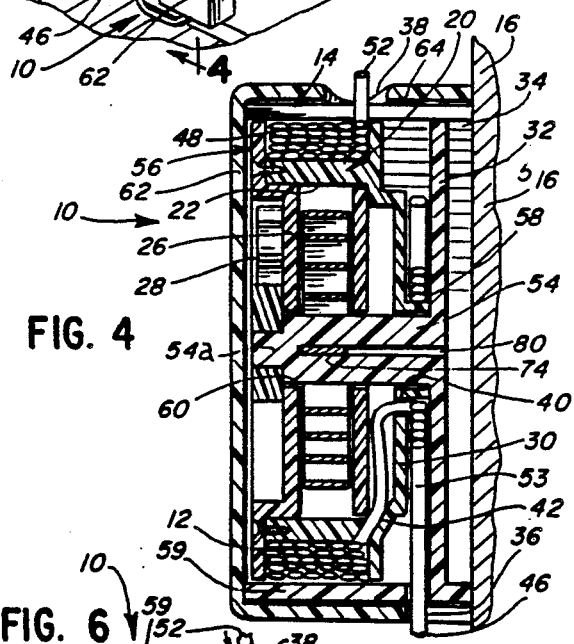
FIG. 4 is a cross-sectional view taken on the line 4—4 of FIG. 2 illustrating the components when the cord is fully retracted.
Figure 6:
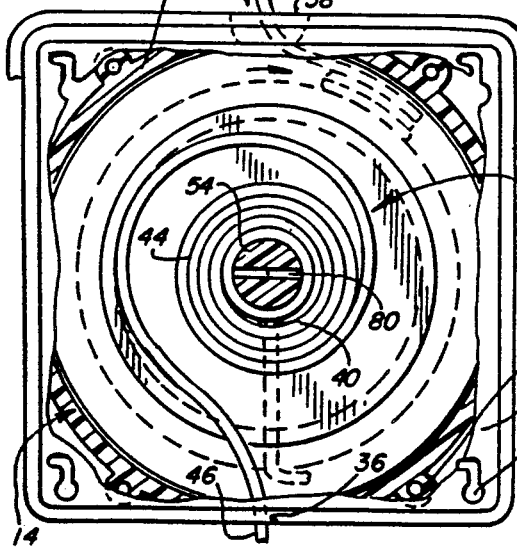
FIG. 6 is a rear elevational view, with the housing wall removed, illustrating the components when the cord is fully retracted.

Referring specifically to FIGS. 4 and 6, the cord 12 includes a first portion 44 normally wound in a radially confined helical array about the axis 24 of the reel 20 in the expansion chamber 34. The first portion 44 of the cord 12 is maintained in an axially confined planar helical array by the radial wall 30 of the reel 20 and the housing wall 32 and is of a length to permit withdrawal of at least a portion thereof to reach the telephone 17 or telephone jack 18. As shown, the first portion 44 of the cord 12 has an end 46 extending from the first opening 36 in the housing 14 for connection to the telephone 17 or telephone jack 18.

Still referring to FIGS. 4 and 6, the cord 12 also includes a second portion 48 normally substantially entirely wound on the cylindrical wall 22 of the reel 20. The second portion 48 of the cord 12 is of a length to permit withdrawal of at least a portion thereof by pulling on an outwardly extending part of the second portion 48 of the cord 12 to rotate the reel 20 in a direction opposite the one direction of spring biasing to accommodate movement of a telephone 50 or telephone handset 51 from one location to another. As will be seen in FIGS. 2 and 3, the second portion 48 of the cord 12 has an end 52 extending from the second opening 38 in the housing 14 for connection to the telephone 50 or telephone handset 51.

As best shown in FIG. 1, the cord 12 extends through the axially extending aperture 40 in the radial wall 30 of the reel 20 and the radially extending aperture 42 in the cylindrical wall 22 of the reel 20. It will be appreciated, of course, that the cord 12 is integral entirely along its length and, thus, the short section 53 of the cord 12 confined within the space defined by the cylindrical wall 22 of the rotatable reel 20 is merely a portion of the overall length of the cord 12 between the first portion 44 thereof and the second portion 48 thereof. Preferably, the short section 53 of the cord 12 is frictionally retained by reason of the sizing of the axially extending aperture 40 in the radial wall 30 of the reel 20 and the radially extending aperture 42 in the cylindrical wall 22 of the reel 20.

Figure 5:
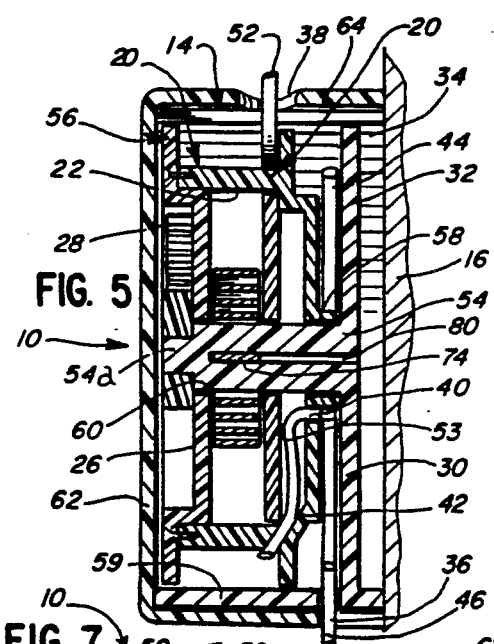
FIG. 5 is a cross-sectional view taken on the line 5—5 of FIG. 2 illustrating the components when the cord is fully withdrawn.
Figure 7:
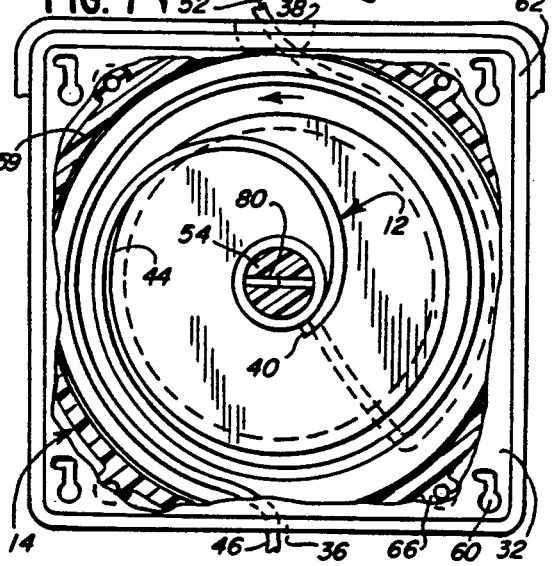
FIG. 7 is a rear elevational view, with the housing wall removed, illustrating the components when the cord is fully withdrawn.

Referring now to FIGS. 5 and 7, the first portion 44 of the cord 12 will be repositioned to a radially expanded helical array within the expansion chamber 34 during withdrawal of the second portion 48 of the cord 12. It may later be desirable to retract some or all of the second portion 48 of the cord 12 into the housing 14, which is accommodated by means of the spring 26 which biases the reel for rotation in the one direction to achieve retraction when the ratchet 28 is positioned so as to offer no restraint to reel rotation. When this occurs, the first portion 44 of the cord 12 is returned to the radially confined helical array during retraction of the second portion 48 of the cord 12, as illustrated in FIGS. 4 and 6.

Referring to FIGS. 1, 4 and 6, the housing 14 includes a spindle 54 and the reel 20 is carried by the spindle 54 for rotation thereon. The spindle 54 is preferably integral with the housing 14, i.e., with the housing wall 32 in the embodiment illustrated. With this arrangement, the spring 26 is mounted so as to extend between the reel 20 and the spindle 54 of the housing 14.

In the preferred embodiment, the reel 20 has a cord retaining radial wall on both sides thereof. The spring 26 is then disposed between the radial walls 30 and 56 and radially inwardly of the cylindrical wall 22 of the reel 20. As will be appreciated, the spindle 54 extends through coaxial spindle-receiving bores 58 and 60 in the radial walls 30 and 56.

Referring specifically to FIG. 1, one of the radial walls 56 has a disc portion 56a axially recessed within the cylindrical wall 22. It will be seen that the ratchet 28, which comprises a ratchet gear 28a, a pawl lever 28b, and a spring 28c, is mounted within the axially recessed disc portion 56a of the one of the radial walls 56. With this arrangement, the ratchet 28 is contained so as to be disposed entirely within the axial recess defined by the disc portion 56a, i.e., inwardly of the flange 56b.

Preferably, the housing 14 includes a cylindrical reel receiving wall 59. The cylindrical reel-receiving wall 59 is advantageously integral with the housing wall 32 and is dimensioned so as to receive the cord-retaining radial walls 30 and 56 therein. With this arrangement, the cylindrical reel-receiving wall 59 and the reel 20 substantially entirely encase the second portion 48 of the cord 12 therebetween.

As shown in FIGS. 1 and 2, the housing 14 is preferably square in shape. The housing wall 32, which may comprise a base, includes fastener-receiving openings 60 for mounting the housing 14 on the wall 16 in proximity to the telephone 17 or telephone jack 18. Further, the housing 14 also includes a removable cover 62.

With this arrangement, the second opening 38 in the housing 14 is in the cover 62. The cylindrical reel-receiving wall 58 also has a cutout 64 aligned with the second opening 38 in the cover 62. As shown, the second portion 48 of the cord 12 extends from the reel 20 completely through the aligned opening 38 and cutout 64.

Preferably, the telephone cord 12 is flat cable and includes a plug-in connector on one end thereof for connection to the telephone 17 or telephone jack 18 and a plug-in connector on the other end thereof for connection to the telephone 50 or telephone handset 51. It will be appreciated that the flat cable readily accommodates the expansion and contraction of the helical winding array in the expansion chamber 34, although round cable could also be utilized for this purpose. In any event, by reason of the unique action in the expansion chamber 34, it is possible to form the retractable reel assembly 10 in a highly functional yet most compact manner.

As will be seen, the housing 14 will include means for retaining the cover 62 in assembled relationship with the housing wall 32. This may include expandable studs 66 adapted to extend into mating sleeves 68, after which screws 70 may be inserted from the rear of the housing wall 32 to lock the studs 66 in the sleeves 68. However, the cover 62 can be secured to the housing wall 32 in any conventional manner.

Similarly, it will be seen that the spring 26 has bent end portions 72 and 74 which are adapted for insertion into respective slots 76 and 80 formed in the cylindrical wall 22 of the reel 20 and the spindle 54. Likewise, the end 54a of the spindle 54 is noncircular in cross section to extend through a correspondingly shaped aperture 82 in the ratchet gear 28a with the screw 84 securing the ratchet gear 28a against movement relative to the housing 14. Finally, the pawl lever 28b is secured to the disc portion 56a of the radial wall 56 by means of a stud 86 which allows pivotal movement against the biasing force of the springs 28c which are secured at their opposite ends to studs 88.

As an additional feature, the retractable reel assembly 10 can advantageously be provided with an adjustable stop. The adjustable stop can have any shape so long as it is sized larger than the oval opening 38, and it is suitably disposed in slidable relation on the telephone extension cord 12 with sufficient frictional resistance to be maintained in any selected position of adjustment. In this manner, it is possible to control the amount of the cord 12 that will remain outside the retractable reel assembly 10.

Referring now to FIGS. 8 through 13, another preferred embodiment of retractable reel assembly 100 for a telephone extension cord 102 has been illustrated as including a housing 104 adapted to be mounted in proximity to a telephone or telephone jack for use with either wall mounted or table telephones, respectively. The retractable reel assembly 100 includes a reel 106 defined by a cylindrical wall 108 journaled for rotation about an axis 110 in the housing 104, a spring 116 mounted to operatively extend between the housing 104 and the reel 106 for biasing the reel for rotation in one direction, and a ratchet 118 in the housing 104 for selectively restraining rotation of the reel 106 in the one direction. With this arrangement, the reel 106 has a pair of cord-retaining radial walls 120 and 122 on one side thereof disposed in closely spaced adjacent relation to define a radial cord expansion chamber 124 in the housing 104 (see FIGS. 9 and 11A).

Figure 10:
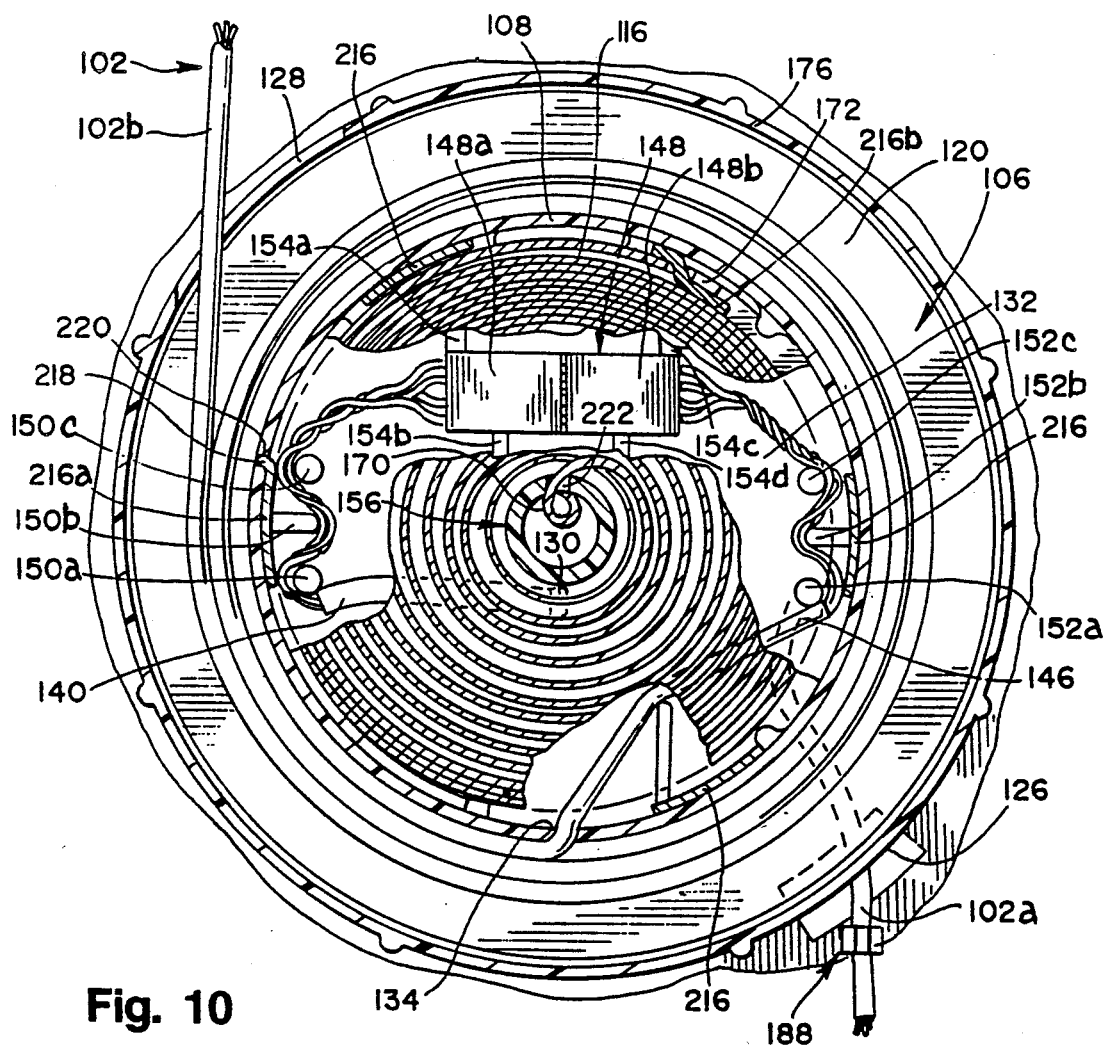
FIG. 10 is a cross-sectional view taken on the line 10—10 of FIG. 9 illustrating the internal arrangement for connecting first and second cord portions.
Figure 11B:
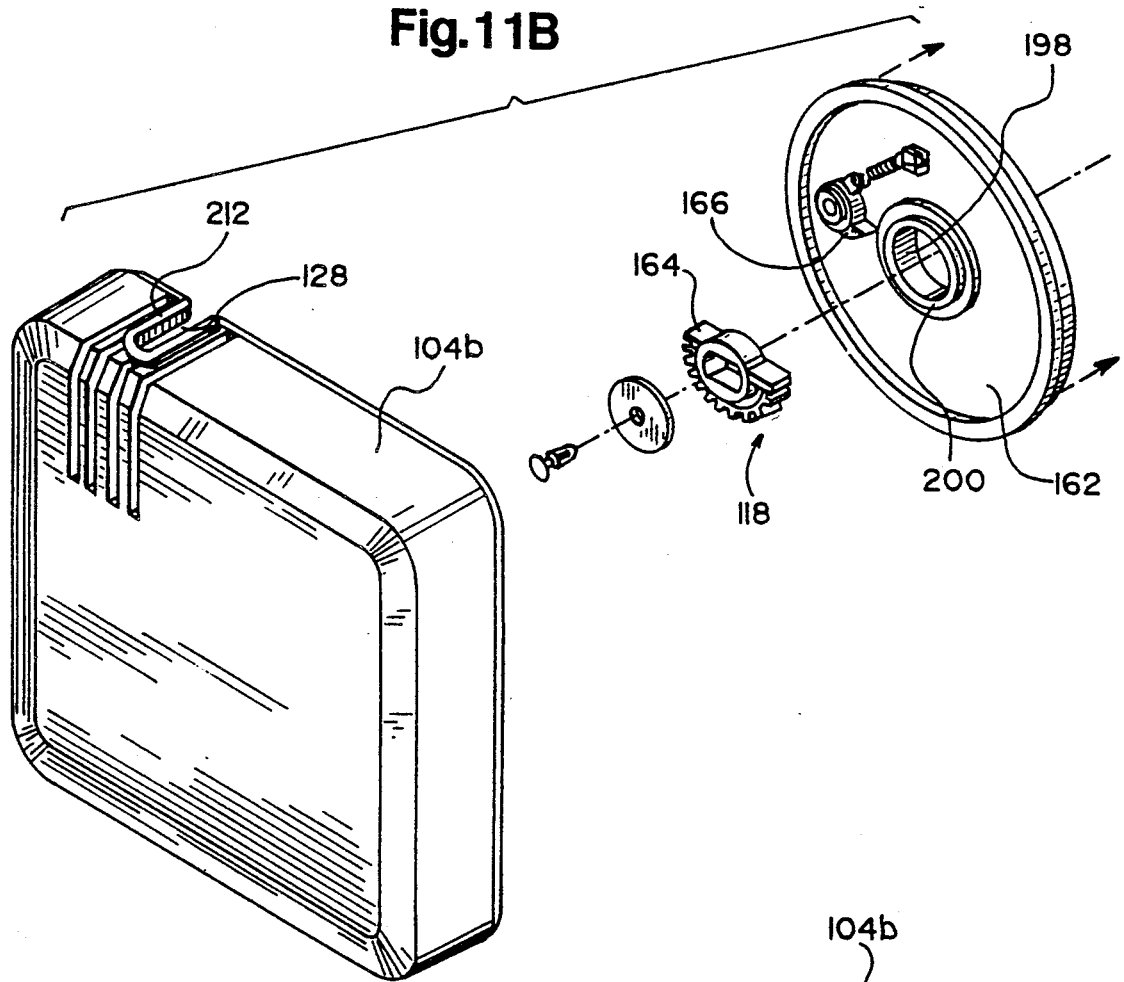
FIG. 11B is an exploded perspective view illustrating additional components of the other preferred embodiment illustrated in FIG. 11A.

As will be appreciated by referring to FIGS. 10, 11A and 11B, the housing 104 has a first opening 126 disposed about the perimeter thereof and leading to the expansion chamber 124 and a second opening 128 disposed about the perimeter thereof and leading from the reel 106. The first opening 126 is axially spaced from the second opening 128 by reason of the axial spacing of the expansion chamber 124 relative to the remainder of the reel 106 and due to the fact that the first opening 126 is in a base portion 104a of the housing 104 whereas the second opening 128 is in a cover portion 104b thereof. In addition and as illustrated in the drawings, the housing 104 is formed such that the first opening 126 is disposed generally at the bottom thereof, while the second opening 128 is somewhat elongated and disposed at the top thereof to enhance the utility of the invention, as best illustrated in FIGS. 11A and 11B.

Referring to FIG. 11A, the radial wall 120 has an axially extending aperture 130 leading from the expansion chamber 124 to a cord interconnection chamber 132. The cord interconnection chamber 132 is radially inwardly of the cylindrical wall 108. Additionally, the cylindrical wall 108 of the reel 106 has a radially extending aperture 134 leading from the cord interconnection chamber 132 to a cord winding surface 108a thereof.

In the embodiment illustrated in FIGS. 8 through 13, the retractable reel assembly includes a flat cord portion 102a normally wound in a radially confined helical array about the axis 110 of the reel 106 in the expansion chamber 124. The flat cord portion 102a is well suited due to the flat nature thereof for being maintained in an axially confined planar helical array by the radial walls 120 and 122 of the reel 106. It will also be seen that the flat cord portion 102a has an end as at 136 extending from the first opening 126 in the housing 104 by a distance sufficient to reach the telephone or telephone jack. The flat cord portion 102a also has a plug-in type of connector 138 on the extending end 136 for connection to the telephone or telephone jack. With this arrangement, the flat cord portion 102a also has a second end 140 extending through the axially extending aperture 130 in the radial wall 120 into the cord interconnection chamber 132.

Still additionally, the cord 102 also includes a round cord portion 102b normally substantially entirely wound on the cord winding surface 108a of the cylindrical wall 108. The round cord portion 102b is well suited for winding and unwinding on the reel 106 in an axially back-and-forth manner and is of a length to permit withdrawal of at least a portion thereof through the second opening 128 in the housing 104 by pulling on an end 142 of the round cord portion 102b extending through the second opening 128 in the housing 104 to rotate the reel 106 in a direction opposite the direction the spring 116 biases the reel 106 to accommodate movement of the telephone or a telephone handset from one location to another. As shown in FIG. 11A, the round cord portion 102b has a plug-in type of connector 144 on the extending end 142 for connection to the telephone or telephone handset.

Still referring to FIG. 11A, the round cord portion 102b also has a second end 146 extending through the radially extending aperture 134 in the cylindrical wall 108 into the cord interconnection chamber 132. It will also be seen that means is provided for connecting the flat cord portion 102a to the round cord portion 102b in the form of a connector generally designated 148 which is located within the cord interconnection chamber 132. Still further, strain relief arrangements generally designated 150 and 152 are provided for the flat cord portion 102a and round cord portion 102b, respectively.

As shown in FIGS. 10 and 11A, the strain relief arrangements 150 and 152 include a plurality of lugs 150a, 150b, 150c and 152a, 152b, 152c for each of the flat and round cord portions. The respective sets of lugs 150a-150c and 152a-152c are arranged to define respective serpentine paths within the cord interconnection chamber 132 for the respective flat and round cord portions. As clearly illustrated, the respective sets of lugs 150a-150c and 152a-152c are in closely spaced relation to the respective connector portions 148a and 148b for each of the flat and round cord portions.

Still further, the retractable reel assembly 100 includes means for retaining the connector portions 148a and 148b in a preselected fixed position within the cord interconnection chamber 132. The retaining means advantageously comprises an additional plurality of lugs 154a-154d. As illustrated, the lugs 154a-154d retain the connector portions 148a and 148b in the preselected position within the cord interconnection chamber 132.

As described in connection with the embodiment illustrated in FIGS. 1 through 7, the spring 116 accommodates retraction of the round cord portion 102b by biasing the reel 106 for rotation in the rewind direction. The flat cord portion 102a is, as described in connection with FIGS. through 7, repositioned to a radially expanded helical array during withdrawal of the round cord portion 102b from the housing 104. In like fashion, the flat cord portion 102a is returned to the radially confined helical array (see FIG. 9) during retraction of the round cord portion 102b into the housing 104.

Figure 8:
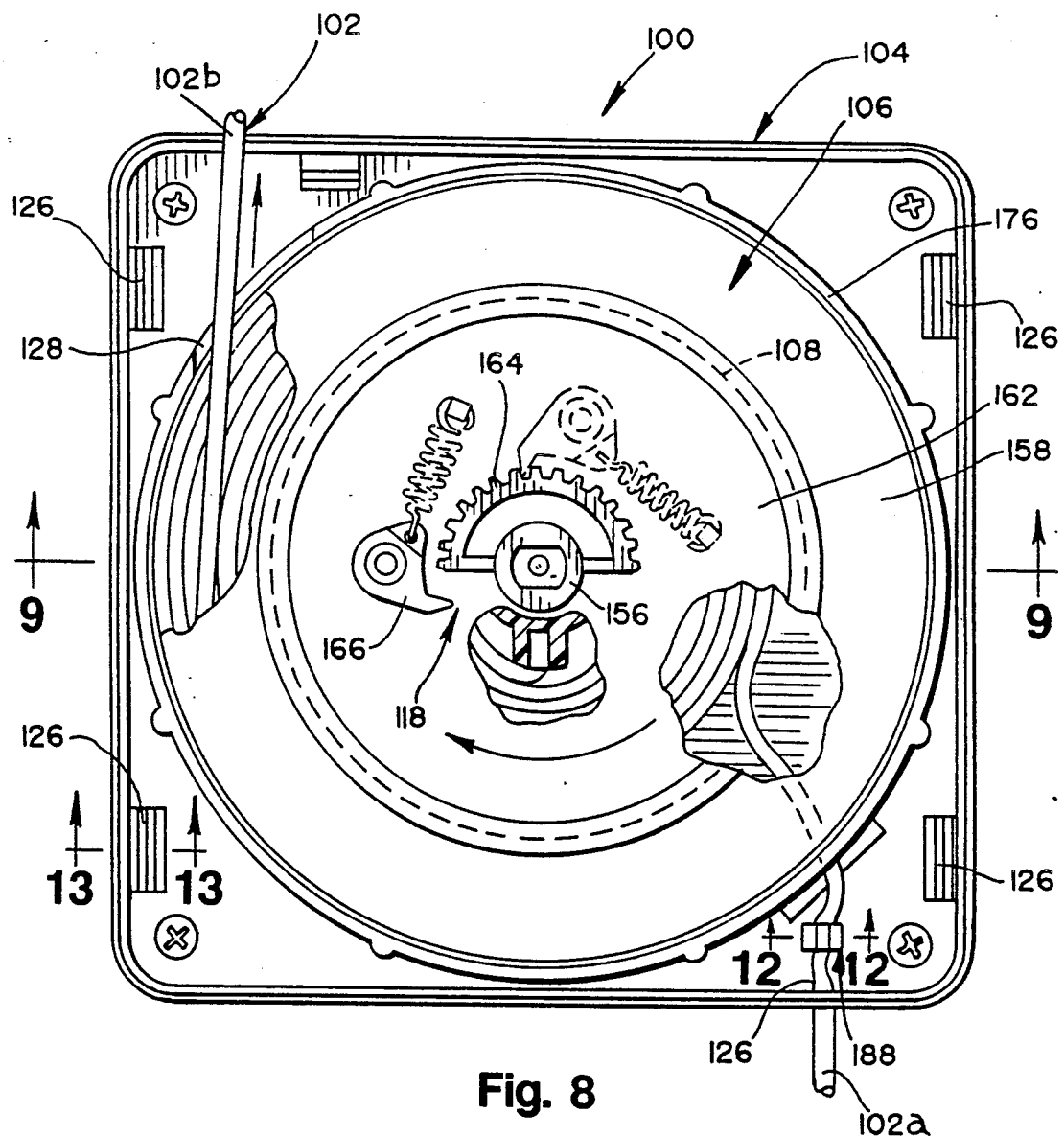
FIG. 8 is a cross-sectional view similar to FIGS. 6 and 7 illustrating another preferred embodiment of the present invention.
Figure 9:
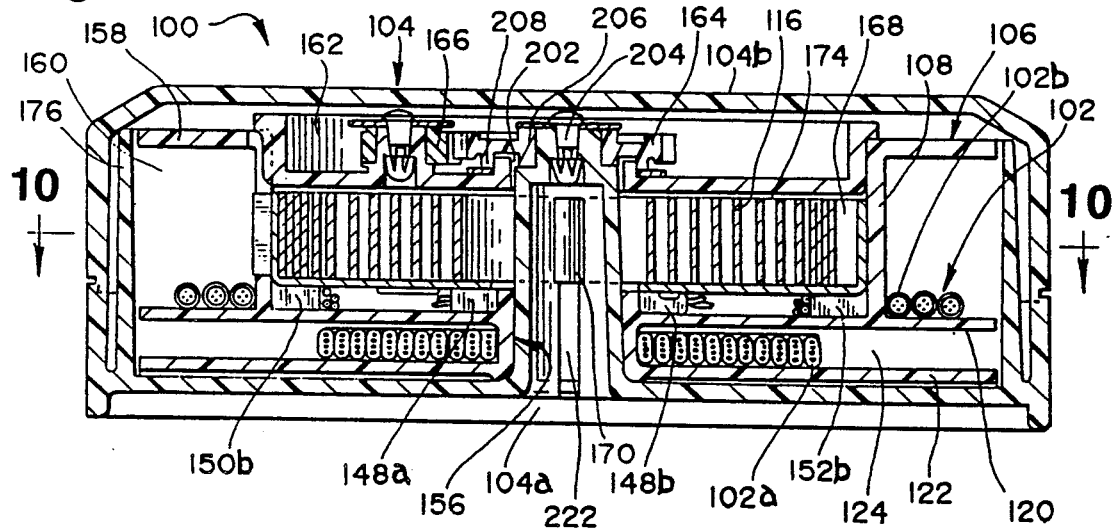
FIG. 9 is a cross-sectional view taken on the line 9—9 of FIG. 8 illustrating the components when the cord is fully retracted.

As best shown in FIGS. 8, 9 and 11A, the housing 104 includes a spindle 156 and the reel 106 is carried by the spindle 156 for rotation thereon. The spindle 156 is advantageously integral with the base portion 104a of the housing 104 and the spring 116 is mounted to operatively extend between the reel 106 and the spindle 156. As shown, the spindle 156 extends substantially coaxially of the cylindrical wall 108 and the radial walls 120 and 122.

Referring specifically to FIGS. 9 and 11A, the reel 106 has an additional cord-retaining wall 158 integrally associated with the cylindrical wall 108. The additional cord-retaining wall 158 along with the cylindrical wall 108 and the cord-retaining radial wall 120 define a cord extension chamber 160. As will be seen from FIG. 9, the spring 116 is disposed between the outermost ones of the radial walls 122 and 158 and radially inwardly of the cylindrical wall 108.

By comparing FIGS. 9 and 11B, it will be seen that the additional cord-retaining radial wall 158 has an associated removable disk portion 162 axially recessed within the cylindrical wall 108. The ratchet 118 may then include a ratchet gear 164 and spring biased pawl lever 166 cooperatively nested within the axially recessed disk portion 162 of the additional cord-retaining radial wall 158. Still further, a spring retainer 168 is axially recessed within the cylindrical wall 108 of the reel 106. The spring 116 has one end 170 secured to the spindle 156 and the other end 172 secured to the spring retainer 168. With this understanding, the disk portion 162 substantially entirely isolates the spring retainer 168 and spring 116 in an enclosed chamber 174 within the reel 106.

As best shown in FIGS. 8, 9 and 11A, the housing 104 includes a cylindrical reel-receiving wall 176 dimensioned so as to receive the cord-retaining radial walls 120, 122 and 158 therein. It will be appreciated especially from FIG. 9 that the cylindrical reel-receiving wall 176 and the reel 106 substantially entirely encase the flat cord portion 102a therebetween, i.e., in the expansion chamber 124 between the cylindrical wall 108, the radial walls 120 and 122, and the cylindrical reel-receiving wall 176. Also as shown, the housing 104 is advantageously a two-part construction comprising the base portion 104a and the cover portion 104b which is removable from the base portion 104a.

More specifically, the housing 104 is advantageously square in shape, as illustrated in the drawings, and it preferably includes fastener-receiving openings 178 for mounting the housing 104 in proximity to the telephone or telephone jack. As will be appreciated, the housing 104 utilizes a removable cover 104b wherein the base portion 104a of the housing 104 and the cover portion 104b include releasable engagement means generally designated 180 (see FIG. 13).

Figure 13:
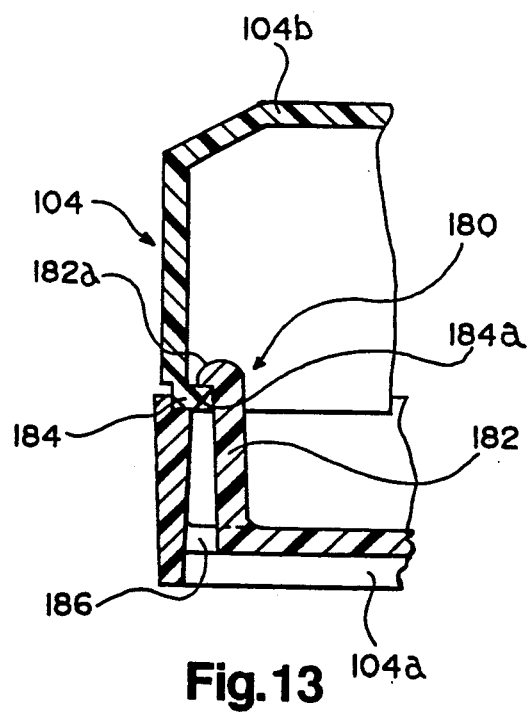
FIG. 13 is a cross-sectional view illustrating a releasable securing arrangement for the other preferred embodiment in accordance with the present invention.

Referring to FIG. 13, the releasable engagement means 180 may advantageously include a plurality of upwardly and outwardly extending fingers 182. Typically, there will be five such fingers provided at spaced locations about the perimeter of the base portion 104a of the housing 104 which are adapted to be engaged by inwardly directed flanges 184 having a chamfered surface 184a adapted to cooperate with corresponding chamfered surfaces 182a on the fingers 182 for initially biasing the fingers 182 inwardly until the flanges 184 pass under the outwardly directed portions of the fingers 182. When it is desired to remove the cover portion 104b, a screwdriver may be inserted through the slots 186 to bias the fingers 182 inwardly to release the engagement between the outwardly extending portions of the fingers 182 and the inwardly directed flanges 184.

Referring to FIGS. 8 and 12, still another aspect of the retractable reel assembly 100 may be understood in that a strain relief arrangement 188 is provided near the first opening 126 in the housing 104 for the flat cord portion 102a. This will serve to prohibit withdrawal of the end 136 extending from the first opening 126 by a distance greater than that which has been predetermined as sufficient to reach the telephone or telephone jack. As illustrated, the strain relief 188 includes an upstanding lug 190 together with a directly opposed finger 192 adapted to grip and confine the flat cable portion 102a in the narrow space 194 therebetween.

Referring to FIG. 11A, the retractable reel assembly 100 can advantageously be provided with an adjustable stop 196 substantially as illustrated. The adjustable stop 196 can have any shape so long as it is sized larger than the second opening 128 in the housing 104, and it is suitably disposed in slidable relation on the round cord portion 102b with sufficient frictional resistance to be maintained in a selected position of adjustment. In this manner, it is possible to control the amount of the round cord portion 102b that will remain outside the retractable reel assembly 100.

As best shown in FIGS. 9 and 11B, the disk portion 162 has a central opening 198 defined by an axially outwardly extending circumferential flange 200 through which the spindle 156 extends. The ratchet gear 164 has a circumferential recess 202 which guides rotational movement of the reel 106 through the circumferential flange 200. As shown, a fastener 204 secures the ratchet gear 164 to the spindle 156 such that the circumferential recess 202 serves as a bearing for the circumferential flange 200 during rotation of the reel 106.

Still additionally, it will be seen that the axially outwardly extending circumferential flange 200 of the disk portion 162 is substantially continuous. Also, the circumferential recess 202 is defined by a pair of radially spaced apart and axially inwardly extending flanges 206 and 208. In this connection, the radially inwardly one of the flanges 206 is substantially continuous while the radially outwardly one of the flanges 208 is periodically circumferentially interrupted.

With this type of arrangement, the retractable reel assembly may be mounted in essentially any orientation, even upside down beneath a cabinet, without impairing the functionability of the reel due to the unique bearing provided thereby.

Referring now to FIG. 11B, the second opening 128 is in the cover portion 104b of the housing 104 as previously mentioned. The cylindrical reel-receiving wall 176 has a cutout as at 210 (see FIG. 11a) aligned with the second opening 128 in the cover portion 104b and the second opening 128 has a cord guide insert 212 having a substantially rounded edge entirely thereabout. With this arrangement, the rounded cord portion 102b extends from the reel 106 completely through the aligned opening 128 and cutout 210 in contact only with the rounded edge of the cord guide insert 212.

As previously mentioned, the spring retainer 168 is axially recessed within the cylindrical wall 108 of the reel 106. It is generally disk-shaped (as shown in FIG. 11A) and has a central opening 214 through which the spindle 156 extends. Further, means are provided for securing the spring retainer 168 to the reel 106 for rotation therewith.

As shown in FIG. 11A, the spring retainer 168 has a plurality of fingers 216 thereabout adapted to frictionally engage the inner surface of the cylindrical wall 108. One of the fingers 216a has a radially outward extension 218 adapted to be disposed in a slot 220 in the cylindrical wall 108 in order to ensure that the spring retainer 168 rotates with the reel 106. Further, another of the fingers 216b has a radially inner circumferential portion 220 to which the end 172 of the coil spring 116 may be attached.

In like fashion, it will be seen that the spindle 156 has a slot 222 therein. The end 170 of the coil spring 116 may be secured to the spindle by placement through the slot 222. In this manner, the spring is mounted to operatively extend between the housing 104 and the reel 106.

Other details of the embodiment illustrated in FIGS. 8 through 13 will now be readily apparent to those skilled in the art. They will either be directly understood from the discussion hereinabove or from the discussion in connection with the embodiment previously illustrated in FIGS. 1 through 7. In both embodiments, a highly effective form of retractable reel assembly for telephone extension cords has been provided.

While in the foregoing there has been set forth a preferred embodiment of the invention, it is to be understood that the invention is only to be limited by the spirit and scope of the appended claims.

I claim:

1. A retractable reel assembly for a telephone extension cord, comprising:

a housing adapted to be mounted in proximity to a telephone or telephone jack;

a reel defined by a cylindrical wall journaled for out an axis in said housing;

a spring for biasing said reel for rotation in one direction, said spring being mounted to extend between said housing and said reel;

a ratchet in said housing for selectively restraining rotation of said reel in said one direction;

said reel having a pair of cord-retaining radial walls on one side thereof, said radial walls being disposed in closely spaced adjacent relation, said radial walls defining a radial cord expansion chamber in said housing;

said housing having a first opening disposed about the perimeter thereof and leading to said expansion chamber, said housing having a second opening disposed about the perimeter thereof and leading from said reel;

one of said radial walls of said reel having an axially extending aperture leading from said expansion chamber to a cord interconnection chamber, said cord interconnection chamber being radially inwardly of said cylindrical wall, said cylindrical wall of said reel having a radially extending aperture leading from said cord interconnection chamber to a cord winding surface of said cylindrical wall;

said cord including a flat cord portion normally being wound in a radially confined helical array about said axis of said reel in said expansion chamber;

said flat cord portion being maintained in an axially confined planar helical array by said radial walls of said reel, said flat cord portion having an end extending from said first opening in said housing by a distance sufficient to reach said telephone or telephone jack, said flat cord portion having a connector on said extending end for connection to said telephone or telephone jack;

said flat cord portion having a second end extending through said axially extending aperture in said one of said radial walls into said cord interconnection chamber;

said cord also including a round cord portion normally being substantially entirely wound on said cord winding surface of said cylindrical wall, said round cord portion being of a length to permit withdrawal of at least a portion thereof through said second opening in said housing by pulling on an end of said round cord portion extending through said second opening in said housing to rotate said reel in a direction opposite said one direction to accommodate movement of said telephone or a telephone handset from one location to another, said round cord portion having a connector on said extending end for connection to said telephone or telephone handset;

said round cord portion having a second end extending through said radially extending aperture in said cylindrical wall into said cord interconnection chamber;

means for connecting said flat cord portion to said round cord portion within said cord interconnection chamber;

said spring accommodating retraction of said round cord portion by biasing said reel for rotation in said one direction;

said flat cord portion being repositioned to a radially expanded helical array during withdrawal of said round cord portion and being returned to said radially confined helical array during retraction of said round cord portion.

2. The retractable reel assembly as defined by claim 1 wherein said housing includes a spindle and said reel is carried by said spindle for rotation thereon, said spindle being integral with said housing and said spring being mounted to operatively extend between said reel and said spindle of said housing.

3. The retractable reel assembly as defined by claim 2 wherein said reel has an additional cord-retaining radial wall, said additional cord-retaining radial wall along with said cylindrical wall and one of said pair of cord-retaining radial walls defining a cord extension chamber, said spring being disposed between the outermost ones of said radial walls and radially inwardly of said cylindrical wall, said spindle extending substantially coaxially of said radial walls and said cylindrical wall.

4. The retractable reel assembly as defined by claim 1 wherein said reel includes an additional cord-retaining radial wall having a disc portion axially recessed within said cylindrical wall, said ratchet including a ratchet gear and spring biased pawl lever cooperatively nested within said axially recessed disc portion of said additional cord-retaining radial wall.

5. The retractable reel assembly as defined by claim 4 wherein said housing includes a spindle and said reel is carried by said spindle for rotation thereon, said spindle being integral with said housing and said spring being mounted to operatively extend between said reel and said spindle of said housing.

6. The retractable reel assembly as defined by claim 5 including a spring retainer axially recessed within said cylindrical wall of said reel, said spring having one end secured to said spindle and the other end secured to said spring retainer, said disc portion substantially entirely isolating said spring retainer and spring in an enclosed chamber within said reel.

7. The retractable reel assembly as defined by claim 1 wherein said housing includes a cylindrical reel-receiving wall, said cylindrical reel-receiving wall being dimensioned so as to receive said cord-retaining radial walls therein, said cylindrical reel-receiving wall and said reel substantially entirely encasing said flat cord portion therebetween.

8. The retractable reel assembly as defined by claim 7 wherein said housing includes a spindle and said reel is carried by said spindle for rotation thereon, said spindle being integral with said housing and said spring being mounted to operatively extend between said reel and said spindle of said housing.

9. The retractable reel assembly as defined by claim 8 wherein said reel includes an additional cord-retaining radial wall having a disc portion axially recessed within said cylindrical wall, said ratchet including a ratchet gear and spring biased pawl lever cooperatively nested within said axially recessed disc portion of said additional cord-retaining radial wall.

10. The retractable reel assembly as defined by claim 1 wherein said housing is square in shape, said housing including fastener-receiving openings for mounting said housing in proximity to said telephone or telephone jack, said housing also including a removable cover wherein said housing and said cover include releasable engagement means.

11. The retractable reel assembly as defined by claim 1 further including strain relief means for each of said flat and round cord portions and means for retaining said cord connecting means in a preselected position within said cord interconnection chamber.

12. The retractable reel assemble as defined by claim 11 wherein said strain relief means includes a plurality of lugs for each of said flat and round cord portions, said lugs being arranged to define a serpentine path within said cord interconnection chamber in closely spaced relation to said cord connecting means for each of said flat and round cord portions.

13. The retractable cord assembly as defined by claim 11 wherein said retaining means comprises a plurality of lugs adapted to receive and retain said cord connecting means for each of said flat and round cord portions in said preselected position within said cord interconnection chamber.

14. The retractable cord assembly as defined by claim 1 including strain relief means for said flat cord portion adjacent said first opening in said housing to prohibit withdrawal of said end extending from said first opening by a distance greater than said distance sufficient to reach said telephone or telephone jack.

15. The retractable reel assembly as defined by claim 1 including adjustable stop means associated with said round cord portion externally of said housing, said adjustable stop means being slidably disposed on said round cord portion for varying the amount of said cord remaining outside said housing.

16. A retractable reel assembly for a telephone extension cord, comprising:
a housing adapted to be mounted in proximity to a telephone or telephone jack;
a reel defined by a cylindrical wall journaled for rotation about an axis in said housing;
a spring for biasing said reel for rotation in one direction relative to said housing;
said housing including a spindle and said reel being carried by said spindle for rotation thereon, said spindle being integral with said housing, said spring being mounted to operatively extend between said reel and said spindle;
a ratchet in said housing for selectively restraining rotation of said reel in said one direction;
said reel having a pair of cord-retaining radial walls substantially on opposite sides thereof, said radial walls being disposed in axially spaced relation relative to said cylindrical wall, said radial walls and said cylindrical wall defining a cord extension chamber in said housing;
said reel also defining a cord expansion chamber in said housing;
a disc portion axially recessed within said cylindrical wall of said reel radially inwardly of one of said radial walls, said axially recessed disc portion having a central opening defined by an axially outwardly extending circumferential flange through which said spindle extends, said ratchet including a ratchet gear having a circumferential recess adapted to receive said circumferential flange therewithin, said circumferential recess guiding rotational movement of said reel through said circumferential flange;
means for securing said ratchet gear to said spindle such that said circumferential recess serves as a bearing for said circumferential flange during rotation of said reel;
said housing having a first opening disposed about the perimeter thereof and leading to said expansion chamber, said housing having a second opening disposed about the perimeter thereof and leading from said reel;
said reel having an aperture leading from said expansion chamber to a point radially inwardly of said cylindrical wall, said reel also having an aperture leading from said radially inwardly point to a cord winding surface of said cylindrical wall;
said cord including a first portion normally wound in a radially confined helical array within said expansion chamber about said axis of said reel in said housing, said expansion chamber being adapted to maintain said first portion of said cord in an axially confined planar helical array, said first portion of said cord having an end extending from said first opening in said housing by a distance sufficient to reach said telephone or telephone jack;
said first portion of said cord also extending into said point radially inwardly of said cylindrical wall;
said cord also including a second portion normally being substantially entirely wound on said cord winding surface of said cylindrical wall, said second portion of said cord being of a length to permit withdrawal of at least a portion thereof through said second opening in said housing by pulling on an end of said second portion of said cord extending through said second opening in said housing to rotate said reel in a direction opposite said one direction to accommodate movement of said telephone or a telephone handset from one location to another, said second portion of said cord having a connector on said extending end for connection to said telephone or telephone handset;
said second portion of said cord also extending from said point radially inwardly of said cylindrical wall;
said spring accommodating retraction of said second portion of said cord by biasing said reel for rotation in said one direction;
said first portion of said cord being repositioned to a radially expanded helical array during withdrawal of said second portion of said cord and being returned to said radially confined helical array during retraction of said second portion of said cord.

17. The retractable reel assembly as defined by claim 16 including a spring retainer axially recessed within said cylindrical wall of said reel, said spring retainer being generally disc-shaped and having a central opening through which said spindle extends including means for securing said spring retainer to said reel for rotation therewith, said spring having one end secured to said spindle and the other end secured to said spring retainer.

18. The retractable reel assembly as defined by claim 16 wherein said housing is square in shape, said housing including fastener-receiving openings for mounting said housing in proximity to said telephone or telephone jack, said housing also including a removable cover wherein said housing and said cover include releasable engagement means.

19. The retractable reel assembly as defined by claim 16 wherein said housing includes a cylindrical reel-receiving wall, said cylindrical reel-receiving wall being dimensioned so as to receive said cord-retaining radial walls therein, said cylindrical reel-receiving wall and said reel substantially entirely encasing said first cord portion therebetween.

20. The retractable reel assembly as defined by claim 19 wherein said housing includes a cover and said second opening in said housing is in said cover, said cylindrical reel-receiving wall having a cutout aligned with said second opening in said cover and said cutout has a cord guide insert having a rounded portion thereabout, said second portion of said cord extending from said reel completely through said aligned opening and cutout in contact only with said cord guide insert.

21. The retractable reel assembly as defined by claim 16 wherein said first portion of said cord is a flat cable portion and includes a plug-in connector on said extending end thereof and said second portion of said cord is a round cable portion and includes a plug-in connector on said extending end thereof.

22. The retractable reel assembly as defined by claim 16 including adjustable stop means associated with said cord externally of said housing, said adjustable stop means being slidably disposed on said cord for varying the amount of said cord remaining outside said housing.

23. The retractable reel assembly as defined by claim 16 wherein said axially outwardly extending flange of said disc portion is substantially continuous and said circumferential recess is defined by a pair of radially spaced axially inwardly extending flanges.

24. The retractable reel assembly as defined by claim 23 wherein a radially inwardly one of said flanges is substantially continuous and a radially outwardly one of said flanges is periodically circumferentially interrupted.

25. The retractable reel assembly as defined by claim 16 wherein said reel has an additional cord-retaining radial wall, said additional cord-retaining radial wall along with said cylindrical wall and one of said pair of cord-retaining radial walls defining said cord expansion chamber in said housing, said spring being disposed between the outermost ones of said radial walls and radially inwardly of said cylindrical wall, said spindle extending substantially coaxially of said radial walls and said cylindrical wall.

26. A retractable reel assembly for a telephone extension cord, comprising:
    a housing adapted to be mounted in proximity to a telephone or telephone jack;
    a reel defined by a cylindrical wall journaled for rotation about an axis in said housing;
    a spring for biasing said reel for rotation in one direction relative to said housing;
    said housing including a spindle and said reel being carried by said spindle for rotation thereon, said spindle being integral with said housing, said spring being mounted to operatively extend between said reel and said spindle;
    a ratchet in said housing for selectively restraining rotation of said reel in said one direction;
    said reel having a pair of cord-retaining radial walls substantially on opposite sides thereof, said radial walls being disposed in axially spaced relation relative to said cylindrical wall, said radial walls and said cylindrical wall defining a cord extension chamber in said housing;
    said reel also defining a cord expansion chamber in said housing;
    a spring retainer axially recessed within said cylindrical wall of said reel, said spring retainer being generally disc-shaped and having a central opening through which said spindle extends, and including means for securing said spring retainer to said reel for rotation therewith;
    said spring comprising a coil spring having one end secured to said spindle and the other end secured to said spring retainer;
    a disc portion cooperating with said cylindrical wall of said reel at a point radially inwardly of one of said radial walls, said disc portion having a central opening through which said spindle extends, said disc portion substantially entirely isolating said spring retainer and spring in an enclosed chamber within said reel;
    said housing having a first opening disposed about the perimeter thereof and leading to said expansion chamber, said housing having a second opening disposed about the perimeter thereof and leading from said reel;
    said reel having an aperture leading from said expansion chamber to a point radially inwardly of said cylindrical wall, said reel also having an aperture leading from said radially inwardly point to a cord winding surface of said cylindrical wall;
    said cord including a first portion normally wound in a radially confined helical array within said expansion chamber about said axis of said reel in said housing, said expansion chamber being adapted to maintain said first portion of said cord in an axially confined planar helical array, said first portion of said cord having an end extending from said first opening in said housing by a distance sufficient to reach said telephone or telephone jack;
    said first portion of said cord also extending into said point radially inwardly of said cylindrical wall;
    said cord also including a second portion normally being substantially entirely wound on said cord winding surface of said cylindrical wall, said second portion of said cord being of a length to permit withdrawal of at least a portion thereof through said second opening in said housing by pulling on an end of said second portion of said cord extending through said second opening in said housing to rotate said reel in a direction opposite said one direction to accommodate movement of said telephone or a telephone handset from one location to another, said second portion of said cord having a connector on said extending end for connection to said telephone or telephone handset;
    said second portion of said cord also extending from said point radially inwardly of said cylindrical wall;
    said spring accommodating retraction of said second portion of said cord by biasing said reel for rotation in said one direction;
    said first portion of said cord being repositioned to a radially expanded helical array during withdrawal of said second portion of said cord and being returned to said radially confined helical array during retraction of said second portion of said cord.

27. The retractable reel assembly as defined by claim 26 wherein said housing is square in shape, said housing including fastener-receiving openings for mounting said housing in proximity to said telephone or telephone jack, said housing also including a removable cover wherein said housing and said cover include releasable engagement means.

28. The retractable reel assembly as defined by claim 26 wherein said first portion of said cord is a flat cable portion and includes a plug-in connector on said extending end thereof and said second portion of said cord is a round cable portion and includes a plug-in connector on said extending end thereof.

29. The retractable reel assembly as defined by claim 26 including adjustable stop means associated with said second cord portion externally of said housing, said adjustable stop means being slidably disposed on said second cord portion for varying the amount of said cord remaining outside said housing.

30. The retractable reel assembly as defined by claim 26 wherein said housing includes a cylindrical reel-receiving wall, said cylindrical reel-receiving wall being dimensioned so as to receive said cord-retaining radial walls therein, said cylindrical reel-receiving wall and said reel substantially entirely encasing said first cord portion therebetween.

31. The retractable reel assembly as defined by claim 30 wherein said housing includes a cover and said second opening in said housing is in said cover, said cylindrical reel-receiving wall having a cutout aligned with said second opening in said cover and said cutout has a cord guide insert having a rounded portion thereabout, said second portion of said cord extending from said reel completely through said aligned opening and cutout in contact only with said cord guide insert.

32. The retractable reel assembly as defined by claim 26 wherein said reel has an additional cord-retaining radial wall, said additional cord-retaining radial wall along with said cylindrical wall and one of said pair of cord-retaining radial walls defining said cord expansion chamber in said housing, said spring being disposed between the outermost ones of said radial walls and radially inwardly of said cylindrical wall, said spindle extending substantially coaxially of said radial walls and said cylindrical wall.

* * * * *

REEXAMINATION CERTIFICATE (3206th)
United States Patent [19]

Burke

[11] B1 5,094,396
[45] Certificate Issued May 27, 1997

[54] RETRACTABLE REEL ASSEMBLY FOR TELEPHONE EXTENSION CORD

[75] Inventor: Paul C. Burke, Lake Forest, Ill.

[73] Assignee: Telefonix, Inc., Chicago, Ill.

Reexamination Request:
No. 90/004,353, Sep. 4, 1996

Reexamination Certificate for:
Patent No.: 5,094,396
Issued: Mar. 10, 1992
Appl. No.: 541,846
Filed: Jun. 21, 1990

Related U.S. Application Data

[63] Continuation-in-part of Ser. No. 267,184, Nov. 4, 1988, Pat. No. 4,989,805.

[51] Int. Cl.[6] .................................................. B65H 75/48
[52] U.S. Cl. .................. 242/378.2; 242/375; 242/385.1
[58] Field of Search .................................. 242/378, 378.1, 242/378.2, 378.3, 378.4, 375, 375.2, 379, 385, 385.1, 385.2, 385.3, 385.4; 191/12.2 R, 12.2 A, 12.4

[56] References Cited

U.S. PATENT DOCUMENTS

| | | |
|---|---|---|
| 1,276,825 | 8/1918 | Swope. |
| 1,446,410 | 2/1923 | Bennett et al. |
| 1,737,978 | 12/1929 | Sebell. |
| 1,958,626 | 5/1934 | Krantz. |
| 2,211,561 | 8/1940 | Flannelly. |
| 2,262,587 | 11/1941 | Kaempf. |
| 2,678,779 | 5/1954 | Bellmer. |
| 2,979,576 | 4/1961 | Huber ............................ 191/12.4 |
| 3,061,234 | 10/1962 | Morey. |
| 3,432,623 | 3/1969 | Blanch et al. ................ 191/12.2 |
| 3,657,491 | 4/1972 | Ryder et al. .................. 191/12.2 |
| 3,812,307 | 5/1974 | Wagner et al. ................ 200/52 R |
| 3,854,017 | 12/1974 | Crim ............................. 191/12.2 |
| 4,053,118 | 10/1977 | Aikins. |
| 4,384,688 | 5/1983 | Smith. |
| 4,646,987 | 3/1987 | Peterson. |

FOREIGN PATENT DOCUMENTS

| | | |
|---|---|---|
| 171356 | 5/1952 | Austria. |
| 1590 160 | 5/1981 | United Kingdom. |

*Primary Examiner*—John M. Jillions

[57] ABSTRACT

To provide a highly functional yet very compact retractable reel assembly for a telephone extension cord, a housing is provided which is adapted to be mounted on a wall in proximity to a telephone or telephone jack for utilization with either wall mounted or table telephones, respectively. The retractable reel assembly includes a reel biased for rotation in one direction, a ratchet for selectively restraining rotation of the reel in the one direction, and an expansion chamber for a length of the cord within the housing, whereby the portion of the cord leading to the telephone or telephone jack can normally be wound in a radially and axially confined planar helical array. With this arrangement, the retractable reel assembly can allow the portion of the cord to be repositioned to a radially expanded helical array during withdrawal of the remainder of the cord from the housing and returned to the radially and axially confined helical array during retraction of the remainder of the cord into the housing.

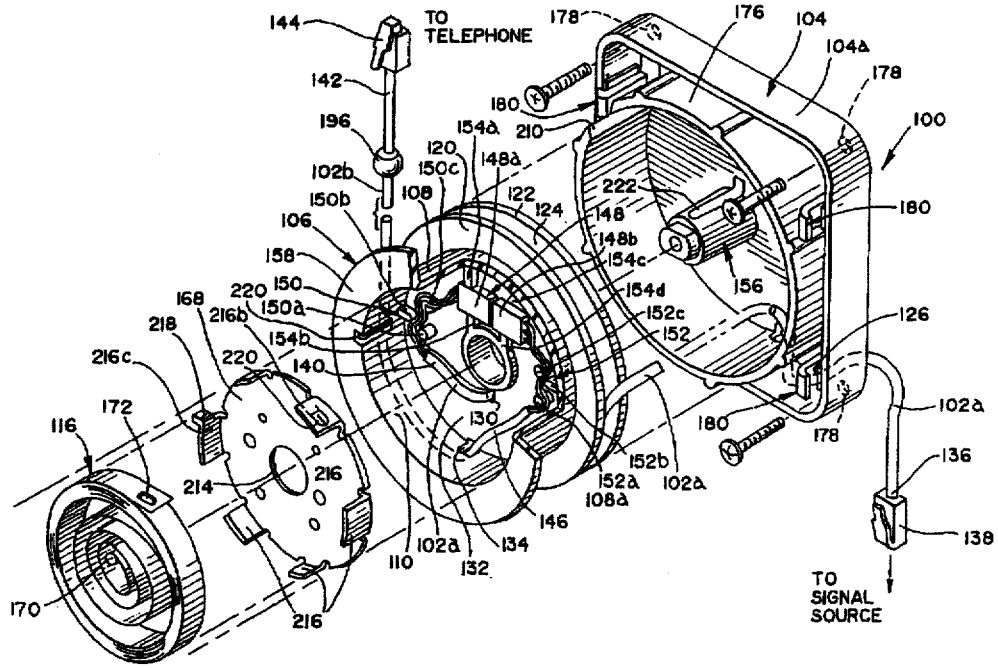

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16–32 is confirmed.

Claim 1 is determined to be patentable as amended.

Claims 2–15, dependent on an amended claim, are determined to be patentable.

1. A retractable reel assembly for a telephone extension cord, comprising:
   a housing adapted to be mounted in proximity to a telephone or telephone jack;
   a reel defined by a cylindrical wall journaled for [out] *rotation about* an axis in said housing;
   a spring for biasing said reel for rotation in one direction, said spring being mounted to extend between said housing and said reel;
   a ratchet in said housing for selectively restraining rotation of said reel in said one direction;
   said reel having a pair of cord-retaining radial walls on one side thereof, said radial walls being disposed in closely spaced adjacent relation, said radial walls defining a radial cord expansion chamber in said housing;
   said housing having a first opening disposed about the perimeter thereof and leading to said expansion chamber, said housing having a second opening disposed about the perimeter thereof and leading from said reel;
   one of said radial walls of said reel having an axially extending aperture leading from said expansion chamber to a cord interconnection chamber, said cord interconnection chamber being radially inwardly of said cylindrical wall, said cylindrical wall of said reel having a radially extending aperture leading from said cord interconnection chamber to a cord winding surface of said cylindrical wall;
   said cord including a flat cord portion normally being wound in a radially confined helical array about said axis of said reel in said expansion chamber;
   said flat cord portion being maintained in an axially confined planar helical array by said radial walls of said reel, said flat cord portion having an end extending from said first opening in said housing by a distance sufficient to reach said telephone or telephone jack, said flat cord portion having a connector on said extending end for connection to said telephone or telephone jack;
   said flat cord portion having a second end extending through said axially extending aperture in said one of said radial walls into said cord interconnection chamber;
   said cord also including a round cord portion normally being substantially entirely wound on said cord winding surface of said cylindrical wall, said round cord portion being of a length to permit withdrawal of at least a portion thereof through said second opening in said housing by pulling on an end of said round cord portion extending through said second opening in said housing to rotate said reel in a direction opposite said one direction to accommodate movement of said telephone or a telephone handset from one location to another, said round cord portion having a connector on said extending end for connection to said telephone or telephone handset;
   said round cord portion having a second end extending through said radially extending aperture in said cylindrical wall into said cord interconnection chamber;
   means for connecting said flat cord portion to said round cord portion within said cord interconnection chamber;
   said spring accommodating retraction of said round cord portion by biasing said reel for rotation in said one direction;
   said flat cord portion being repositioned to a radially expanded helical array during withdrawal of said round cord portion and being returned to said radially confined helical array during retraction of said round cord portion.

* * * * *